H. C. HERVEY & G. H. ABRAMS.
Car-Coupling.

No. 167,244.                                   Patented Aug. 31, 1875.

WITNESSES:                                     INVENTORS:

UNITED STATES PATENT OFFICE.

HENRY C. HERVEY AND GEORGE H. ABRAMS, OF ATHENS, NEW YORK.

IMPROVEMENT IN CAR-COUPLINGS.

Specification forming part of Letters Patent No. 167,244, dated August 31, 1875; application filed July 3, 1875.

*To all whom it may concern:*

Figure 1:
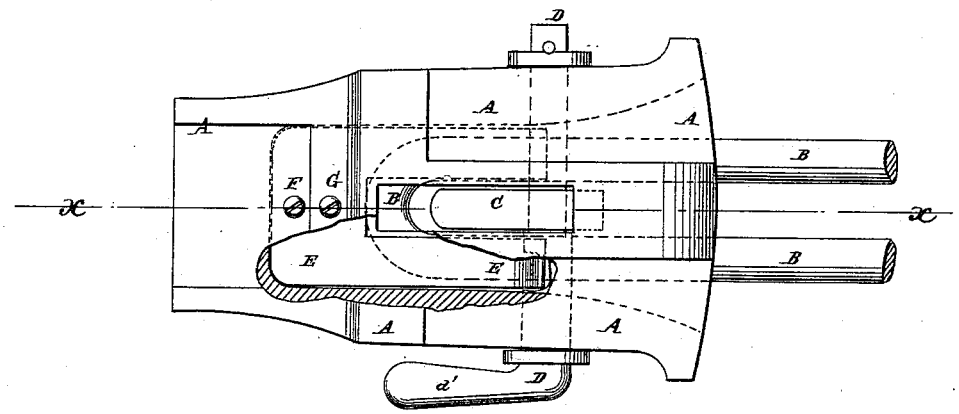
Figure 2:
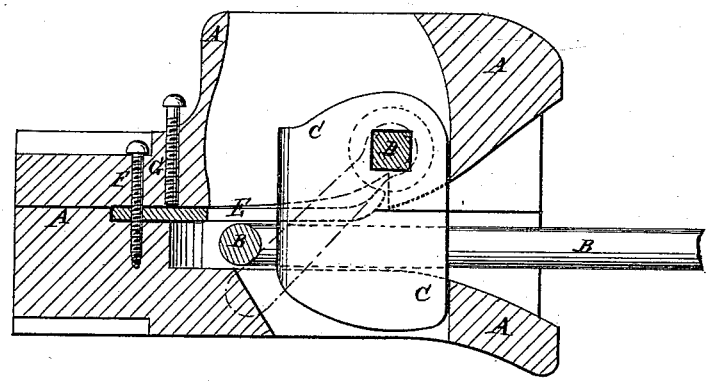

Be it known that we, HENRY C. HERVEY and GEORGE H. ABRAMS, of Athens, in the county of Greene and State of New York, have invented a new and useful Improvement in Car-Coupling, of which the following is a specification:

Figure 1 is a top view of our improved car-coupling, part being broken away to show the construction. Fig. 2 is a vertical section of the same, taken through the line $x$ $x$, Fig. 1.

Similar letters of reference indicate corresponding parts.

The invention will be first described in connection with drawing, and then pointed out in the claim.

A is the draw-head, the mouth of which is made hopper-shaped. The cavity of the bumper-head rapidly contracts, its inner part being only large enough to allow the link B to have the necessary vertical and lateral play. In the middle part of the bumper-head A is formed a vertical slot, in which is pivoted a dog, C. The dog C is made broad, and of about the shape shown in Fig. 2, and is pivoted near its upward forward corner by a bolt, D, which passes through it and through the said bumper-head.

With this construction, when the cars are run together the entering link B pushes the dog C back and passes it, when the said dog instantly drops through the link, and the cars are coupled. With this construction also, when the cars are coupled, the forward edge of the dog C rests against a solid shoulder of the bumper-head, both above and below the link B, so as to have a firm support.

The bolt D is secured in place at its forward end by a washer and pin or key, and its rear end has a heavy pear-shaped handle formed upon it, and projecting at right angles with the length of said bolt. The bolt D is rigidly connected with the dog C, so that the said dog C can be raised to uncouple the cars by means of the handle $d'$ of said bolt D. The handle $d'$, when the cars are coupled, projects rearward and downward at an angle of about forty-five degrees, so that its weight may assist in holding the dog C in place. In the inner upper part of the cavity of the bumper-head A is secured a spring, E, the forward part of which is slotted to receive the dog C, and its forward ends are bent upward, as shown in Fig. 2, so as to serve as guides to the link B in passing to its place in said bumper-head.

The spring E is designed to hold the link B in a horizontal position, so that it will enter the bumper-head of the adjacent car when the cars are run together. The spring E should have sufficient elasticity to allow the link B to have the necessary vertical and lateral play. The spring E is held in place by a screw or bolt, F, passing down through the bumper-head A, and through the rear part of the spring E. The tension of the spring E is adjusted as required by a set-screw, G, which passes down through the bumper-head A, and the forward end of which rests against the upper side of the said spring E.

The spring E may be made in two parts or pieces, in which case two screws or bolts, F, and two set-screws, G, should be used.

The handle $d'$ may have a chain attached to its end, and extending up to the platform or top of the car, for convenience in uncoupling the cars.

Having thus described our invention, we claim as new and desire to secure by Letters Patent—

The combination, with a link, B, and pivoted dog C, of a bifurcated spring, E, to hold the one and guide the other, as and for the purpose set forth.

HENRY C. HERVEY.
GEORGE H. ABRAMS.

Witnesses:
GEO. W. ABRAMS,
JOEL A. COOPER.